INVENTOR.
L. M. OBERLIN

BY Hudson & Young
by: L. Malcolm Oberlin

ATTORNEYS

INVENTOR.
L. M. OBERLIN
BY Hudson & Young
by: L. Malcolm Oberlin
ATTORNEYS

Patented Feb. 5, 1952

2,584,809

UNITED STATES PATENT OFFICE 2,584,809

COMPUTER FOR SOLVING SIMULTANEOUS EQUATIONS

Lyman M. Oberlin, Dewey, Okla., assignor to Phillips Petroleum Company, a corporation of Delaware Application August 1, 1949, Serial No. 107,927

8 Claims. (Cl. 235—61)

This invention relates to computers. In another aspect, it relates to a computer wherein coefficients of the equations to be solved are inserted by adjustment of variable impedance networks and the apparatus thereafter automatically obtains a solution to the equations. In still another aspect, it relates to a clutch device for selectively connecting a plurality of variable impedances to a driving shaft.

Computers have been developed which are adapted for the solution of simultaneous linear equations, the coefficients of the equations to be solved being inserted into the computer by adjusting impedances, such as variable resistors, which were connected in an impedance network. Each network was provided with one or more balancing resistors and these resistors were successively adjusted manually to balance the networks, at which time the setting of the balancing resistors represented the solution to the series of linear simultaneous equations. In order to obtain a high degree of accuracy, it was necessary to make several adjustments to each balancing resistor, which was a time consuming operation. In addition, fatigue on the part of the operator and errors in reading the indicator provided for showing a balanced network condition introduced corresponding errors into the solution of the series of equations.

It is an object of this invention to provide a computer which automatically obtains a solution of the equations once the coefficients are inserted into the computer.

It is a further object to substantially reduce the time required in solving simultaneous equations and to eliminate errors in judgment on the part of an operator.

It is still a further object of the invention to provide a novel clutch device for selectively connecting a plurality of variable impedances to a common driving shaft.

It is a still further object to provide a computer which is reliable in operation, and uses a minimum number of standard circuit components.

Various other objects, advantages and features of the invention will become apparent to those skilled in the art from the accompanying disclosure and drawings, in which.

Figure 1:
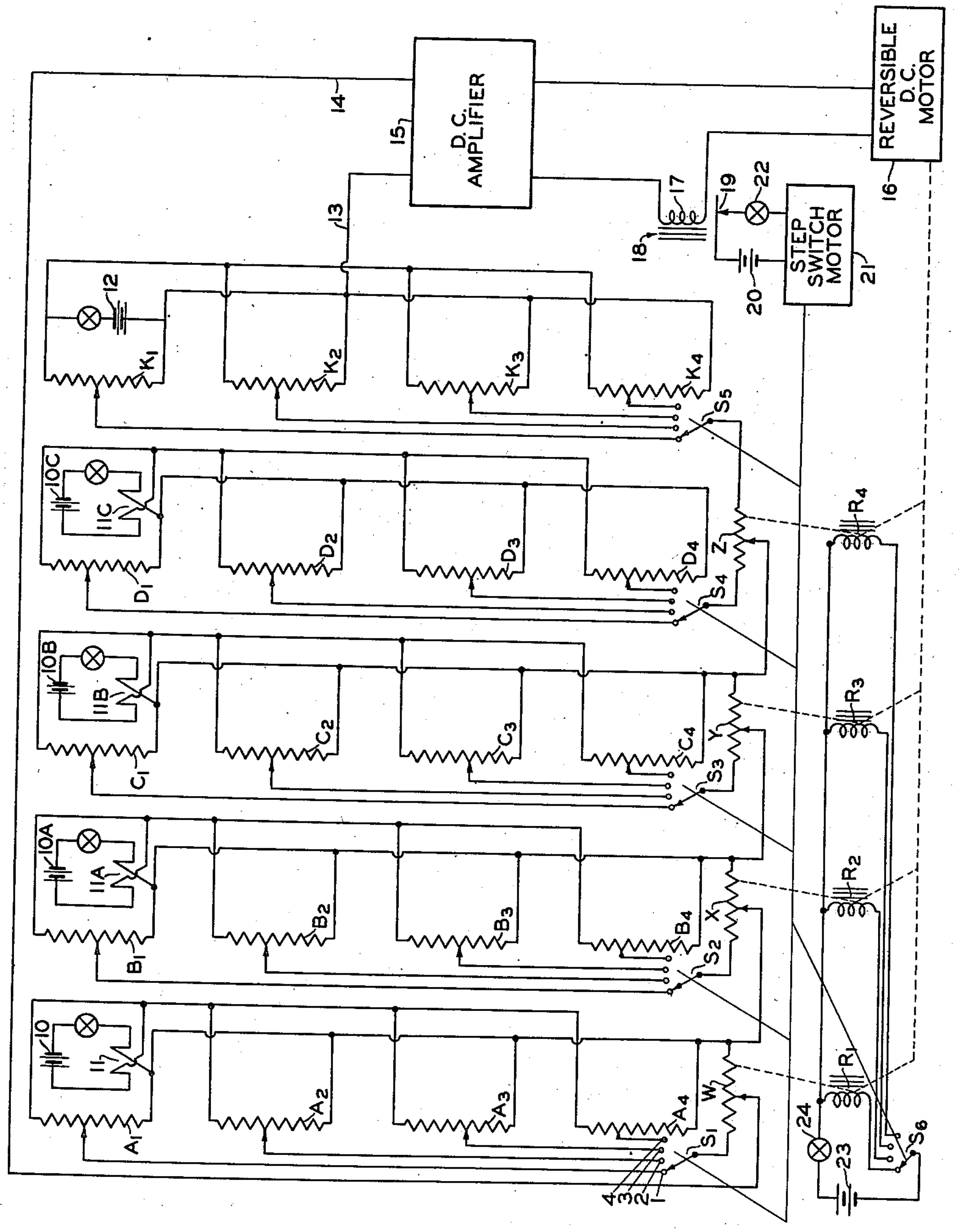
Figure 1 is a schematic circuit diagram of the computer.

Referring now to the drawings in detail, and particularly to Figure 1, the control apparatus of this invention is shown in connection with a computer of the type adapted to solve simultaneous linear equations by the principle of successive iteration. The invention is also applicable to different types of computers, such as computers for solving simultaneous differential equations. In the example shown by Figure 1, the computer is adapted for the solution of four linear simultaneous equations in four unknowns. Each equation of the set is represented by a variable impedance network extending transversely of the sheet upon the drawing. Thus, the setting of variable resistors A–1, B–1, C–1, D–1, and K–1 represents the coefficients of the first equation while the setting of variable resistors A–4, B–4, C–4, D–4, and K–4 represents the coefficients of the fourth equation, it being understood that resistor K–4 represents the constant term while resistances A–4, B–4, C–4, and D–4 represent the coefficients of the variables in the equations. In the present example, a voltage drop is produced across each of the resistances making up the network by a battery 10 and a reversing switch 11, the reversing switch being provided so that the polarity of the voltage impressed across the resistance may be changed to represent a negative coefficient. It will be noted that battery 10 and reversing switch 11 establish a voltage drop across each of the resistances A–1 to A–4, inclusive. Similar batteries 10a, 10b, 10c and reversing switches 11a, 11b, 11c are provided for the other variable resistances of the networks. The variable resistors K are connected in circuit with a battery 12 to provide a voltage drop across said variable resistors and each of the batteries has a switch connected in circuit therewith to prevent current flow when the apparatus is not in use.

A plurality of balancing resistors W, X, Y, and Z are connected in circuit with the impedance networks by a multi-gang switch S, the sections of which are shown at S–1 to S–6, inclusive. When this switch is in position 1, the balancing resistors W, X, Y, and Z are connected in parallel, respectively, with the network resistors A–1, B–1, C–1, and D–1. When the switch is moved to its other positions, the balancing resistors are connected in parallel with the respective variable resistors of the second, third and fourth networks. It will be apparent that settings of balancing resistors W, X, Y, and Z represent the values of the variables in the system of simultaneous equations to which the computer is applicable. With the switch in position 1, for example, resistor W is connected in cascade with resistor A–1 and, similarly, the other balancing resistors are connected in cascade with the respective network resistors. Accordingly, the voltage drop produced across each set of balancing and network resistors is proportional to the product of their resistances, that is, to the product of the coefficient and variable represented by the settings of the resistors. The sum of the voltage drops across each set of cascaded resistors and across resistor K–1 appears between leads 13 and 14. When the voltage across these leads is zero, the values of the variables represented by the settings of balancing resistors W, X, Y, and Z are such that the equation is satisfied. When the balancing resistors are not set to values at which the equation is satisfied, an error voltage appears across leads 13, 14 the amplitude of the error voltage being proportional to the amount by which the variables depart from values which satisfy the equation. Similarly, when switch S is moved to position 2, an error voltage is produced across leads 13, 14 unless the settings of balancing resistors W, X, Y, and Z is such that the equation represented by the settings of variable resistors A–2, B–2, C–2, and K–2 is satisfied.

When the settings of the balancing resistors W, X, Y, and Z are found at which the error voltage is zero as switch S is moved through positions 1 to 4, the values of the variables represented by the setting of the balancing resistors are a solution to the set of equations represented by the four resistance networks in the computer.

In some cases, the sections S–1 to S–5 of switch S may be eliminated and a ganged variable resistance may be substituted for each of the balancing resistors W, X, Y, and Z, each section of the ganged resistor being connected in cascade with one of the network resistors. The present invention is also applicable to computers wherein the multiplication of the variables and coefficients is attained by an Ohm's law device. In such a computer, for example, a variable resistance may represent the coefficient, the current through the resistance may represent the variable, and the voltage drop across the resistance represents the product of the variable and coefficient. In all such computers, as well as in many types of computers for solving differential equations, an error voltage is produced unless the electrical quantities representing the variable of the equation are so adjusted as to balance the circuit, that is, to provide a solution to the equation.

In accordance with the invention, the error voltage appearing across leads 13, 14 is fed to a direct current amplifier 15, the output of which is applied to a reversible direct current motor 16 and the winding 17 of a relay 18 having normally closed contacts 19. The contacts 19 are connected in circuit with a battery 20, a motor 21 and a switch 22. The motor 21, in turn, is connected mechanically to the switch S and operates to move said switch successively to its different positions when energized by closure of contacts 19. When an error voltage appears across leads 13 and 14, relay 18 is energized and contacts 19 are open with the result that the motor 21 is de-energized. However, when the error voltage drops to zero, relay 18 is de-energized with resultant closure of contacts 19, thereby effecting operation of motor 21 to move switch S to its next position.

Figure 3:
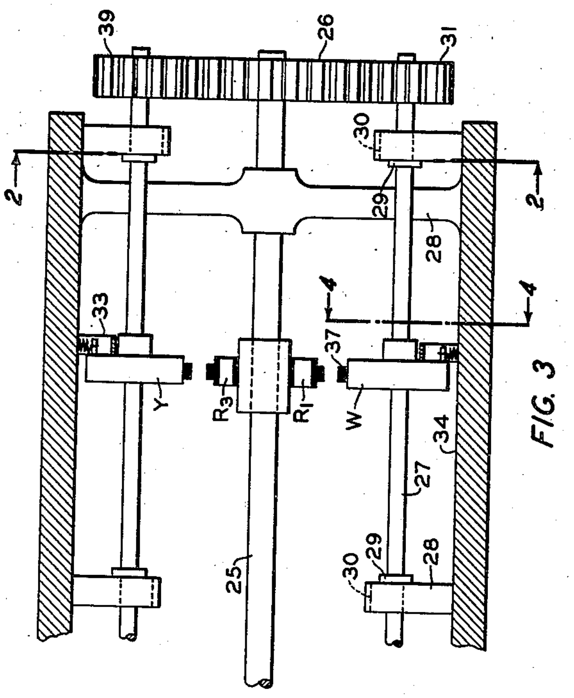
Figure 3 is a sectional view taken along the line 3—3 of Figure 2.
Figure 2:
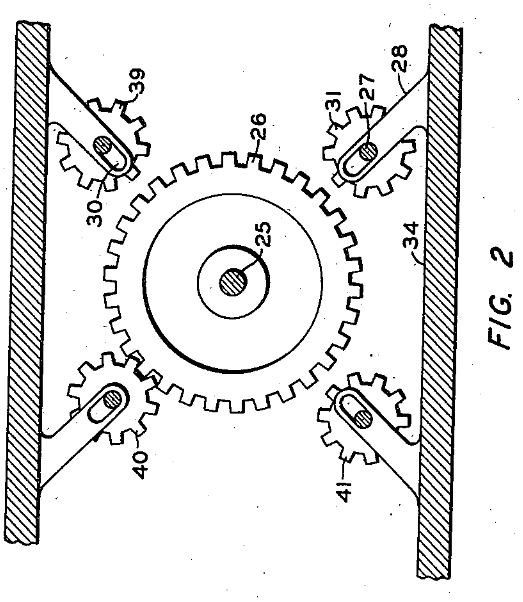
Figure 2 is a side elevational view of the clutch device.
Figure 4:
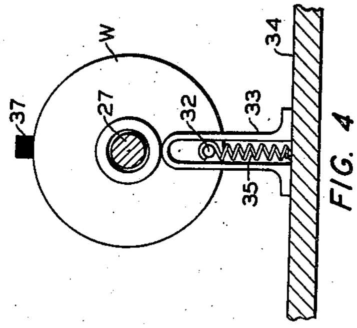
Figure 4 is a detail view illustrating a feature of the invention.

Reversible motor 16 is selectively coupled to the balancing resistors W, X, Y, and Z by the clutch apparatus shown in Figures 2 to 4. This clutching device includes a series of relay coils R–1 to R–4 which are connected in circuit with a battery 23, a switch 24 and section S–6 of multigang switch S. As will become apparent, when coil R–1 is energized, motor 16 is connected mechanically to resistor W and, when coils R–2, R–3, and R–4 are selectively energized, motor 16 is mechanically connected to the respective balancing resistors X, Y, and Z.

Referring now to Figure 3, it will be noted that reversible motor 16 drives a shaft 25 carrying a gear 26. The balancing resistors W, X, Y, and Z are spaced around the shaft 25 and each balancing resistor is supported in the manner shown by Figure 2. In this figure, it will be noted that balancing resistor W has a control shaft 27 which is carried by slotted supports 28, the control shaft being provided with collars 29 to prevent longitudinal movement of the shaft. Slots 30 to the supports 28 are so arranged as to allow radial movement of the variable resistor and its control shaft toward and away from the gear 26 carried by driving shaft 25. The control shaft carries a gear 31 which is normally disengaged from gear 26. To this end, the casing of balancing resistor W is provided with a pin 32 which is carried by a slotted member 33 projecting from base 34. A spring 35 is mounted between pin 32 and base 34 to urge balancing resistor W and its control shaft radially outward from gear 26. Balancing resistor W also carries an armature 37 which is attracted by coil R–1 when the latter is energized, thereby to move balancing resistor W and its control shaft radially inwardly a sufficient distance that gear 31 engages gear 26. Accordingly, balancing resistor W is normally disconnected from gear 26 and the reversible motor driving shaft 25. However, when coil R–1 is energized, gear 31 engages gear 26 and the reversible motor drives control shaft 27 to change the ohmic value of balancing resistor W. Each of the balancing resistors W, Y, and Z is similarly mounted and their control shafts have gears 39, 40 and 41 which are moved into engagement with gear 26 upon energization of the respective coils R–2, R–3, and R–4, Figure 1. In some cases, each control shaft 27 may include speed reduction mechanism to afford a finer adjustment of the variable resistance and, of course, worm gears may be utilized both on the driving and driven shafts, if desired. The coils R are mounted on a sleeve carried by shaft 25, this sleeve being held in a stationary position by a support, not shown.

In the operation of the circuit of Figure 1, the coefficients of the linear simultaneous equations which it is desired to solve are inserted into the computer by appropriate adjustment of resistances A, B, C, D, and K. With switch S in position 1, coil R–1 is energized to connect reversible motor 16 to balancing resistor W and, if the values represented by the setting of variable resistances W, X, Y, and Z are not such as to satisfy the equation represented by coefficients A–1, B–1, C–1, D–1, and K–1, an error voltage is developed across leads 13 and 14. This error voltage energizes relay 18 and prevents operation of motor 21 so that switch S is not moved to position 2. Reversible motor 16 then moves balancing resistor W until the network is balanced, at which time the error voltage becomes zero. Thereupon, relay 18 is de-energized and motor 21 moves switch S to position 2. As a result, coil R–1 is de-energized and coil R–2 is energized, thus disconnecting motor 16 from balancing resistor W, and connecting it to balancing resistor X. With switch S in position 2, the potential drops across resistors A–2, B–2, C–2, and K–2 are added, the resultant voltage appearing across lead 13, 14. If an error voltage is developed, relay 18 is energized to prevent further operation of motor 21 and reversible motor 16 moves balancing resistor X until the network is balanced. It will be noted that balancing resistor W remains at the position to which it was moved by motor 16 as this operation takes place, this setting representing a first assumed value of the variable represented thereby. When the error voltage becomes zero, motor 21 is energized to move switch S to position 3, reversible motor 16 being disconnected from balancing resistor X and connected to balancing resistor Y. The third network is then balanced by adjustment of resistor Y, the balancing resistors W and X remaining at their settings which represent first assumed values of the variables represented thereby. This process is repeated, the construction of the switch S being such that it is moved from position 4 to position 1 when the error voltage becomes zero in the fourth network. If the equation represented by the original settings of the coefficients is solvable by the method of successive iteration, the assumed values of the variables represented by the settings of balancing resistors W, X, Y, and Z become closer to the actual solution each time the resistors are operated to balance their respective networks. Four or five cycles of operation are normally ample to provide a very accurate solution.

It will be apparent that the present computer offers a number of important advantages. A substantial saving in time is effected since the motors and relays operate much more rapidly than the human hand and errors in observation are eliminated. It will be noted that the speed of reversible motor 16 is proportional to the error voltage fed thereto. Accordingly, if the particlar network being adjusted is badly out of balance, motor 16 operates rapidly to effect balance of the network through adjustment of one of the resistors W, X, Y, or Z. However, as the network approaches a balanced condition, the amplitude of the error signal decreases and the motor moves more slowly. This substantially contributes to the speed and accuracy of the solution obtained with this computer. The clutching device of Figures 2 to 4 operates very reliably and contributes substantially to the speed and accuracy with which the solutions to the equations are obtained.

While the invention has been described in connection with a present, preferred embodiment thereof, it is to be understood that this description is illustrative only and is not intended to limit the invention, the scope of which is defined by the apppended claims.

Having described my invention, I claim:

1. In a computer having a plurality of impedance networks including means for producing voltage drops across said networks, a plurality of reference voltages, and a plurality of balancing impedances selectively connected in circuit with said impedance networks; improved means for equalizing the combined voltage drops across said networks and said balancing impedances with said reference voltages comprising, in combination, a reversible motor, means for feeding an error voltage which is the difference between said combined voltage drop and said reference voltage from one network to said reversible motor, a clutch device for selectively connecting said motor to said balancing impedances, means for sensing said error voltage, and means actuated by said sensing means to actuate said clutch device when said error voltage becomes negligible so as to connect said motor to a different balancing impedance.

2. In a computer having a plurality of impedance networks including means for producing voltage drops across said networks, a plurality of reference voltages, and a plurality of balancing resistors selectively connected in circuit with said impedance networks; improved means for equalizing the combined voltage drops across said networks and said balancing resistors with said reference voltages comprising, in combination, a switch for selectively connecting said balancing resistors in circuit with their respective networks so as to produce an error voltage which is the difference between said combined voltage drop and said reference voltage identified with a different network at each such connection of said switch, which error voltage may be eliminated by adjustment of one of said balancing resistors, a motor for actuating said switch, a relay controlling the energization of said motor, means for applying an error voltage to said relay to effect operation of said motor when the error voltage becomes negligible, a reversible motor, means for feeding error voltage to said reversible motor, and means for successively coupling said reversible motor to different balancing resistors as said switch is moved to different positions.

3. In a computer having a plurality of impedance networks including means for producing voltage drops across said networks, a plurality of reference voltages, and a plurality of balancing impedances selectively connected in circuit with said impedance networks; improved means for equalizing the combined voltage drops across said networks and said balancing impedances with said reference voltages comprising, in combination, a switch for selectively connecting said balancing impedances in circuit with the respective network so as to produce an error voltage which is the difference between said combined voltage drop and said reference voltage identified with a different network at each such connection of said switch which error voltage may be eliminated by adjustment by one of said balancing impedances, a motor for actuating said switch, a relay controlling the energization of said motor, means for applying said error voltage to said relay to effect operation of said motor when the error voltage becomes negligible, a reversible motor, means for feeding said error voltage to said reversible motor, a shaft driven by said reversible motor, said balancing impedances being spaced around said shaft, a plurality of solenoids for selectively connecting the respective balancing impedances to said driving shaft, and means for successively actuating said solenoids as said switch is moved to different positions.

4. In a computer having a plurality of impedance networks including means for producing voltage drops across said networks, a plurality of reference voltages, and a plurality of balancing resistors selectively connected in circuit with said impedance networks; improved means for equalizing the combined voltage drops across said networks and said balancing resistors with said reference voltages comprising, in combination, a switch for selectively connecting said balancing resistors in circuit with the respective networks so as to produce an error voltage which is the difference between said combined voltage drop and said reference voltage identified with a different network at each such connection of said switch which error voltage may be eliminated by adjustment of one of said balancing resistors, a motor for actuating said switch, a relay controlling the energization of said motor, an amplifier, means for applying said error voltage to said amplifier, a relay having a set of normally closed contacts, a reversible motor, means for feeding the output of said amplifier to said relay and said reversible motor whereby the relay contacts are closed when the error voltage becomes negligible, and a clutch device controlled by said switch for successively effecting a driving connection between said motor and the respective balancing resistors.

5. In a computer, a plurality of networks each including a plurality of potentiometers and means for producing a voltage drop across each potentiometer, a plurality of balancing potentiometers, one for each network, all of said balancing potentiometers being connected in series, a switch for selectively coupling said balancing potentiometers to said networks so that each balancing potentiometer is connected in cascade with a potentiometer of the network, a direct current amplifier connected in circuit with said balanced potentiometers and a selected network as determined by the setting of said switch to produce an amplified error voltage when the voltage drops across the network potentiometers and balancing potentiometers are unequal to zero, a motor for moving said switch to successively connect the balancing potentiometers in circuit with the respective network potentiometers, means for effecting operation of said motor when the amplified error voltage indicates a balanced condition of said network, a reversible motor, means for feeding the amplified error voltage to said motor, and means actuated by said switch for successively effecting a driving connection between said motor and the balancing resistors.

6. In a computer, a plurality of networks each including a plurality of potentiometers and means for producing a voltage drop across each potentiometer, a plurality of balancing potentiometers, one for each network, all of said balancing potentiometers being connected in series, a switch for selectively coupling said balancing potentiometers to said networks so that each balancing potentiometer is connected in cascade with a potentiometer of the network, a direct current amplifier connected in circuit with said networks balancing potentiometers and a selected network as determined by the setting of said switch to produce an amplified error voltage when the voltage drops across the network potentiometers and balancing potentiometers are unequal to zero, a motor for moving said switch to successively connect the balancing potentiometers in circuit with the respective network potentiometers, means for effecting operation of said motor when the amplified error voltage indicates a balanced network condition, a reversible motor, a shaft driven thereby, said balancing potentiometers being spaced around said shaft, means for feeding the output of said amplifier to said motor, and a plurality of solenoids successively energized by movement of said switch to different positions, the energization of each solenoid effecting a driving connection between said shaft and one of said balancing potentiometers.

7. In a computer, a plurality of networks each including a plurality of potentiometers and means for producing a voltage drop across each potentiometer, a plurality of balancing potentiometers, one for each network, all of said balancing potentiometers being connected in series, a switch for selectively coupling said balancing potentiometers to said networks so that each balancing potentiometer is connected in cascade with a potentiometer of the network, a direct current amplifier connected in circuit with said networks balancing potentiometers and a selected network as determined by the setting of said switch to produce an amplified error voltage when the voltage drops across the network potentiometers and balancing potentiometers are unequal to zero, a motor for moving said switch to successively connect the balancing potentiometers in circuit with the respective network potentiometers, a relay having a set of normally closed contacts and a winding, means for feeding the amplifier error voltage to said winding whereby said contacts are closed when the error voltage indicates a balanced network condition, means connecting said relay contacts in circuit with said motor whereby said motor is actuated when the relay contacts are closed, a reversible motor, means for feeding the output of said amplifier to said motor, and means controlled by said switch for successively effecting a driving connection between said reversible motor and the respective balancing potentiometers.

8. In a computer, a plurality of networks each including a plurality of potentiometers and means for producing a voltage drop across each potentiometer, a plurality of balancing potentiometers, one for each network, all of said balancing potentiometers being connected in series, a switch for selectively coupling said balancing potentiometers to said networks so that each balancing potentiometer is connected in cascade with a potentiometer of the network, a direct current amplifier connected in circuit with said networks balancing potentiometers and a selected network as determined by the setting of said switch to produce an amplified error voltage when the voltage drops across the network potentiometers and balancing potentiometers are unequal to zero, a motor for moving said switch to successively connect the balancing potentiometers in circuit with the respective network potentiometers, a relay having a set of normally closed contacts and a winding, means for feeding the amplifier error voltage to said winding whereby said contacts are closed when the error voltage indicates a balanced network condition, means connecting said relay contacts in circuit with said motor whereby said motor is actuated when the relay contacts are closed, a reversible motor, a shaft driven thereby, said balancing potentiometers being spaced around said shaft, means for feeding the output of said amplifier to said motor, a plurality of solenoids successively energized by movement of said switch to different positions, the energization of each solenoid effecting a driving connection between said shaft and one of said balancing potentiometers.

LYMAN M. OBERLIN.

REFERENCES CITED

The following references are of record in the file of this patent:

UNITED STATES PATENTS

| Number | Name | Date |
|---|---|---|
| 2,446,191 | Pemberton | Aug. 3, 1948 |
| 2,468,150 | Wilcox | Apr. 26, 1949 |
| 2,476,747 | Lovell | July 19, 1949 |